(12) United States Patent
LaMontagne et al.

(10) Patent No.: US 9,904,943 B1
(45) Date of Patent: Feb. 27, 2018

(54) METHODS AND SYSTEMS FOR DISPLAYING INFORMATION ASSOCIATED WITH A SMART OBJECT

(71) Applicant: Trivver, Inc., Huntington Beach, CA (US)

(72) Inventors: Joel LaMontagne, Huntington Beach, CA (US); Simon Keating, Aldershot (GB)

(73) Assignee: Trivver, Inc., Huntington Beach, CA (US)

( * ) Notice: Subject to any disclaimer, the term of this patent is extended or adjusted under 35 U.S.C. 154(b) by 0 days.

(21) Appl. No.: 15/236,323

(22) Filed: Aug. 12, 2016

(51) Int. Cl.
    G06Q 30/02     (2012.01)
    G06K 9/00      (2006.01)
    G06F 3/0483    (2013.01)
    G06F 3/0482    (2013.01)

(52) U.S. Cl.
    CPC ..... G06Q 30/0277 (2013.01); G06K 9/00671 (2013.01); *G06F 3/0482* (2013.01); *G06F 3/0483* (2013.01)

(58) Field of Classification Search
    USPC ..................................................... 705/14.73
    See application file for complete search history.

(56) References Cited

U.S. PATENT DOCUMENTS

| | | |
|---|---|---|
| 6,828,966 B1 | 12/2004 | Gavriliu et al. |
| 8,591,304 B2 * | 11/2013 | Marsland ............... H04L 67/38 463/1 |
| 9,412,121 B2 | 8/2016 | Tatzel et al. |
| 9,443,352 B1 | 9/2016 | Glover et al. |
| 2002/0033845 A1 | 3/2002 | Elber et al. |
| 2006/0007312 A1* | 1/2006 | James ..................... A63F 13/10 348/169 |
| 2006/0287105 A1 | 12/2006 | Willis |
| 2007/0060345 A1 | 3/2007 | Edwards |
| 2007/0060346 A1 | 3/2007 | Edwards |
| 2007/0072676 A1 | 3/2007 | Baluja |
| 2007/0078706 A1 | 4/2007 | Datta et al. |
| 2009/0054140 A1* | 2/2009 | Beser ..................... A63F 13/12 463/31 |

(Continued)

OTHER PUBLICATIONS

Vire AR/VR tracking [available at http://vire.co/tracking], publication date unknown.

*Primary Examiner* — Sun M Li
*Assistant Examiner* — Alexandru Cirnu
(74) *Attorney, Agent, or Firm* — Chhabra Law Firm, PC (57) ABSTRACT

Using various embodiments, methods and systems for displaying information associated with a smart object are described. In one embodiment, a system receives Smart Object Identification Data (SOI) and Smart Object Metric Data (SOMD) of a set of smart objects transmitted from a smart object manager in a three dimensional environment. The system determines that the user has requested Brand Related Detailed Information (BRDI) associated with at least one smart object and generate a list of smart object associated Brand Identification Data (BID) from the set of smart objects, and sort them based on the received SOMD related to each smart object within the set of smart objects. The system retrieves BRDI of a smart object with the highest quantifier of SOMD out of the set of smart objects and transmit the BRDI along with the sorted list of smart object BID to the user.

24 Claims, 9 Drawing Sheets

(56) References Cited

U.S. PATENT DOCUMENTS

| | | |
|---|---|---|
| 2009/0138813 A1 | 5/2009 | LaMontagne |
| 2010/0030640 A1 | 2/2010 | van Datta et al. |
| 2010/0217666 A1 | 8/2010 | Belenguer |
| 2012/0158473 A1* | 6/2012 | Cox .................. G06Q 30/0277 705/14.12 |
| 2013/0158965 A1 | 6/2013 | Beckman |
| 2014/0114742 A1 | 4/2014 | LaMontagne et al. |
| 2014/0149903 A1 | 5/2014 | Ahn et al. |
| 2015/0035822 A1 | 2/2015 | Arsan et al. |
| 2015/0035823 A1 | 2/2015 | Arsan et al. |
| 2016/0019618 A1 | 1/2016 | Lin et al. |
| 2016/0196603 A1 | 7/2016 | Perez et al. |
| 2016/0293133 A1 | 10/2016 | Dutt |
| 2017/0132567 A1 | 5/2017 | Glunz |
| 2017/0228943 A1 | 8/2017 | Arsan et al. |

\* cited by examiner

METHODS AND SYSTEMS FOR DISPLAYING INFORMATION ASSOCIATED WITH A SMART OBJECT

FIELD OF THE INVENTION

Embodiments of the present invention relates generally to the field of displaying information in a three dimensional environment. More particularly, embodiments of the invention relate to displaying information associated with smart objects that can, in one embodiment, be used for advertising purposes in a three dimensional environment.

BACKGROUND OF THE INVENTION

Digital advertising currently requires creating specific and customized content (e.g., images, videos, text, etc.) for each advertiser individually, and placing them directly at various forms of digital platforms (e.g., websites, games, etc.). Furthermore, such advertising often relies on Hypertext Transfer Protocol (HTTP) based cookies. An HTTP cookie, also known as a web cookie or browser cookie, is data sent from a server and stored at a client's machine comprising information related to the user's choices so that only relevant ads are transmitted to the user. Conventionally, once the user visits a website/web-page, a third party cookie is saved locally at the client machine and each time the client revisits the webpage/website the cookie is transmitted back to the third party server. Furthermore, such systems require that the advertiser provide content for the advertisement, however, the advertiser has no control where or how the content would be displayed, except for providing keywords to the advertising system.

However, such advertising systems often result in ineffective advertising due to the inherent limitations of keyword based advertising. Furthermore, fake or mistaken clicks occur regularly, which are further detrimental to the advertiser's interest. Such systems have no means of determining, in advance, if its advertising at a publisher's digital platform would generate in meaningful results. Thus, conventional advertising platforms often result in wasteful and inefficient advertising. Therefore, efficient systems, methods, and techniques are needed that allow a developer, publisher, or advertiser to overcome these limitations and display information to a user based on metric data generated based on user action/viewability.

SUMMARY OF THE DESCRIPTION

Using various embodiments, methods and systems for displaying information associated with a smart object to a user are described. In one embodiment, a system to displaying brand related information to a user is described. The system can be configured to receive smart object identification data and smart object metric data of a set of smart objects in a three dimensional (3D) environment. As described herein, smart objects (also referred to as 3D digital smart objects), in one embodiment, can be used to generate generic content (banner/billboard, videos, and/or 3D assets) that can optionally be replaced with branded content from an advertiser within a variety of digital platforms and measure the user performance with both the generic and branded content across the digital platform. In one embodiment, a smart object comprises an asset encompassed in a transparent 3D asset placeholder that dictates the maximum X-Axis, Y-Axis, and Z-Axis dimensions of an asset/object. The asset within the 3D asset placeholder provides a visual representation of the smart object. The asset can be, in one embodiment, a 3D representation of geometric data, where the asset within the 3D asset placeholder provides a visual representation of the smart object. A smart object comprises an asset that can be any media content such as, 3D non-active assets, assets, video, audio, multi-media object, any general 3D representation of geometric data, or a combination thereof. In various embodiments, smart objects can be used for services related to advertising, notification, or generally for any service that can personalize a viewer's environment with 3D content that is relevant to each viewer.

In one embodiment, the system receives the smart object identification data and smart object metric data transmitted from a smart object manager residing within a three dimensional environment. The system can further be configured to determine that the user has requested brand related detailed information associated with at least one smart object. Thereafter, the system can be configured to generate a list of smart object associated brand identification data from the set of smart objects. The list, in one embodiment, can be sorted based on the smart object metric data related to each smart object within the set of smart objects. The system can then retrieve brand related detailed information of a smart object out of the set of smart objects that is determined to have the highest smart object metric data quantifier value. The system can further transmit the brand related detailed information of the smart object and the sorted list of smart object brand identification data to the user. In one embodiment, the brand related identification data associated with the smart object is displayed to the user via a user interface along with the sorted list of smart object brand identification data.

In another embodiment, the user can request brand related detailed information associated with another smart object by selecting the brand identification data associated with the smart object from the sorted list. In yet another embodiment, the smart object manager can transmit the smart object identification data and the smart object metric data related data of the set of smart objects upon determining the smart object metric data of one smart object. In one embodiment, this smart object can be associated with a branded service or product. In another embodiment, the list of smart object brand identification data is sorted from highest to lowest based on the quantifier value of the smart object metric data of each smart object in the set of smart objects. In one embodiment, to retrieve the brand related detailed information, the system can further be configured to determine the presence of brand identification data associated with a preferred advertiser within the set of smart objects, and retrieve the brand related detailed information of the smart object associated with the preferred advertiser instead of the information related to the smart object with the highest quantifier value of the smart object metric data.

In yet another embodiment, the brand related detailed information transmitted to the user includes engagement data that can be (optionally) elected by an advertiser, and can include a discount coupon, a social media web link, an email based link, a web link to visit a web page associated with the braded information, or a web link to purchase the object or service associated with the at least one smart object. In one embodiment, the system can determine that the user has requested BRDI associated with a smart object by receiving an instruction that the user has selected a tab or button within the user interface. In another embodiment, the set of smart objects, as described herein, can be a number of smart objects within the three dimensional online environment, a number of smart objects displayed on the user interface, a number of smart objects within a scene of the three dimensional environment, or a number of smart objects that have been rendered within the three dimensional environment.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
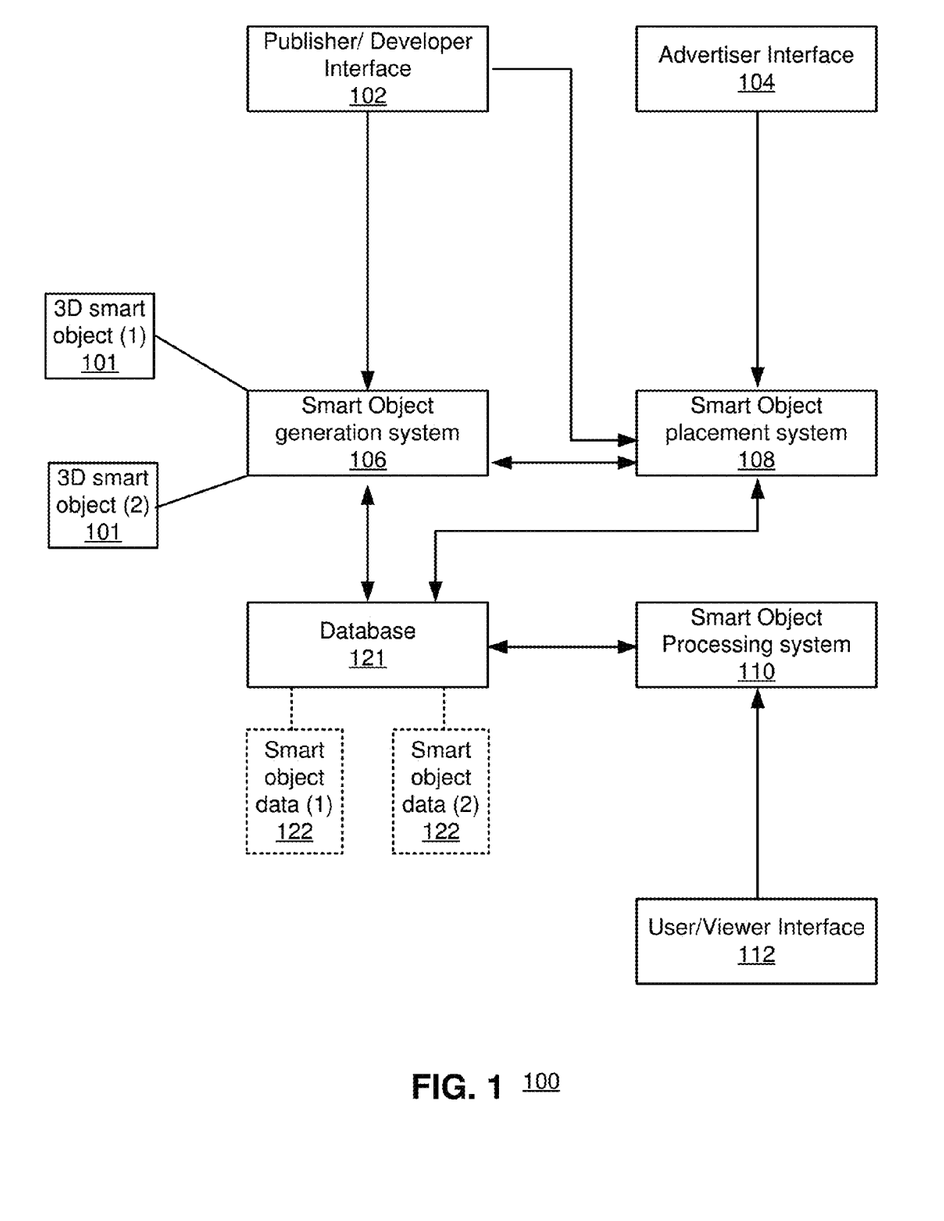
FIG. 1 illustrates a block diagram of a general system architecture that can generate and implement smart objects to process advertising related relevant information, according to one embodiment of the present invention.

FIG. 1 illustrates a block diagram 100 of a general system architecture that can generate and implement smart objects to process advertising related relevant information, according to one embodiment of the present invention. smart objects, in one embodiment, can be used to generate generic content (banner/billboard, videos, and/or 3D assets) that can optionally be replaced with branded content from an advertiser within a variety of digital platforms and measure the user performance with both the generic and branded content across the digital platform. In one embodiment, a smart object comprises an asset encompassed in a transparent 3D asset placeholder that dictates the maximum X-Axis, Y-Axis, and Z-Axis dimensions of an asset/object and/or and understands the scaling dimensions that takes up a specific shape in a 3D digital environment. The asset within the 3D asset placeholder provides a visual representation of the smart object. The asset can be, in one embodiment, a 3D representation of geometric data, where the asset within the 3D asset placeholder provides a visual representation of the smart object. A smart object comprises an asset that can be any media content such as, 3D non-active assets, assets, video, audio, multi-media object, any general 3D representation of geometric data, or a combination thereof. In various embodiments, smart objects can be used for services related to advertising, notification, or generally for any service that can personalize a viewer's environment with 3D content that is relevant to each viewer.

After smart object 101 has been generated, it can be placed into a three dimensional environment by smart object placement system 108. Various exemplary embodiments of generating smart object 101 in a 3D environment are disclosed in U.S. patent application Ser. No. 15/209,679, filed on Jul. 13, 2016, and embodiments to display smart objects within a 3D environment disclosed in U.S. patent application Ser. No. 15/209,688, filed on Jul. 13, 2016 can be employed, in whole or in part, with the present invention. As a result, the above-identified disclosures are incorporated herein by reference in their entirety. It should be noted, in the above stated disclosures, a smart object has been referred to as a 3D digital smart object.

As illustrated, publisher or developer can, using publisher interface 102, request the smart object placement system 108 to place smart object 101 in a three dimensional environment, as described further herein. smart object placement system 108 can request the publisher's input to select a smart object (generated by smart object generation system 106) and save the coordinates, including game identification data, smart object identification data, smart object category/type data, publisher/developer identification data, and location/scene identification data. smart object placement system 108 can interact with the developer using various 3D game development environments. Generally, a 3D environment intending to implement the techniques described herein would need to provide SDK(s), API(s), or any other means using which smart object placement system 108 can interact with the 3D environment's development interface. Thus, in one embodiment, publisher interface 102 can be a game development environment (e.g., Unity® engine, Unreal® engine, Torque 3D® engine, Adobe® Air, etc.). In another embodiment, publisher interface 102 can be any 3D development environment, as known to a person having ordinary skill in the art. However, it should be noted, the invention described herein is not intended to be limited to any particular 3D development environment. Therefore, smart object 101 has been generated by smart object generation system 106, the publisher can request the smart object 101 be placed in a 3D environment by requesting the smart object placement system 108, using a SDK or API set provided to the developer by the 3D environment.

In another embodiment, a system administrator of the smart object placement system 108 can present predetermined smart objects (to the developer) that can be placed within a three dimensional environment using smart object placement system 108. Generally, smart object placement system 108 can be any computing engine that can interact with a 3D environment and determine the location (within the environment) where the smart object has been placed by the developer/publisher, and save it as placement data. smart object placement system 108 can further associate the placement data of smart object 101 in a 3D environment with 3D environment identification data that identifies the digital platform using smart object 101. In one embodiment, the publisher or developer can place smart object 101 as a GSO. In another embodiment, the publisher or developer can place smart object 101 as a BSO. When the developer/publisher places a GSO in the 3D environment, an advertiser, in one embodiment, using advertiser interface 104 can interact with smart object placement system 108 to replace the publisher provided asset with a branded asset to generate a BSO. In yet another embodiment, the developer/publisher can provide the system with a branded asset (instead of a generic asset) to generate a BSO, which is then placed by the developer using smart object placement system 108.

After the placement of smart object 101 into the 3D environment, user interaction or viewability based metrics generated from smart object 101 can be generated via smart object processing system 110. In one embodiment, smart object processing system 110 can be any system that is capable of analyzing information received from smart object 101 and generate metrics related to any user interaction, including tapping, touching, moving, time spent with the smart object, viewing (e.g., from a distance), requesting detailed description, etc., of mart object 101, via user interface 112. The generated metrics can be useful to advertiser and/or publisher associated with the 3D environment.

Figure 2:
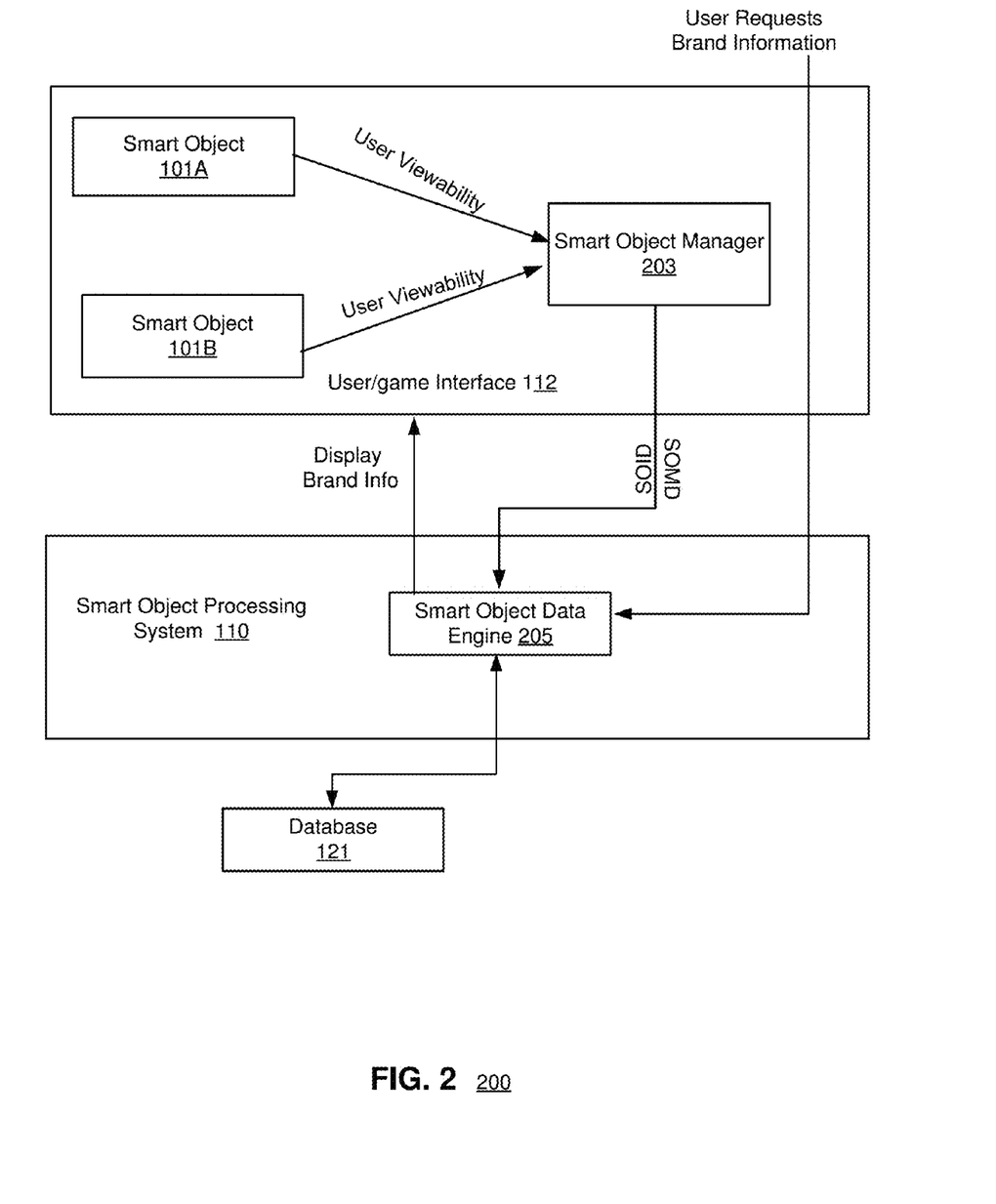
FIG. 2 illustrates a block diagram describing a smart object processing system receiving data from a three dimensional environment, according to one embodiment of the present invention.

FIG. 2 illustrates a block diagram 200 describing a smart object processing system receiving data from a three dimensional environment, according to one embodiment of the present invention. As illustrated, in one embodiment, smart object 101A and 101B can be displayed on user interface 112. Each smart object can include event triggers/scripts that can transmit Smart Object Metric Data (SOMD) to smart object manager 203 when displayed on user interface 112. SOMD can include (but not limited to) data related to determining that a user is viewing a smart object, the user interaction with a smart object, a distance between the user and a smart object, a percentage size of a smart object in relationship to the size of the user interface, a period of time that the user interacted with a smart object, and/or the percentage of the smart object that was viewable on the user's screen (e.g., is the viewable surface of smart object is 50% below the screen). In one embodiment, each smart object 101 can be configured to record different types of interaction of smart object 101 with a user within a 3D environment, and transmit its corresponding SOMD to smart object manager 203, by employing event triggers. Thereafter, smart object manager 203 can forward the information to smart object processing system 110. In one embodiment, event triggers can determine user viewability of a smart object and transmit user viewability data based on the user viewability, to a smart object processing system. In one embodiment, any of the above SOMD can be transmitted from smart object manager 203 to a backend server (e.g., smart object processing system 110).

In one embodiment, smart object manager 203, can be the communication interface between smart objects 101A/101B and smart object processing system 110. In one embodiment, smart object manager 203 resides in the 3D environment, however, smart object manager 203 is not visible to the user (that is, smart object manager runs a background process in the 3D environment). Smart objects 101A and 101B, and smart object manager 203, in one embodiment, can be compiled within the 3D environment, thus becoming an integral part of the environment. In one embodiment, smart object manager 203 receives all event triggers from various smart objects within a 3D environment, and can periodically transmit the user engagement data to smart object processing system 110 of system 100. In one embodiment, each smart object (e.g., 101A, 101B, etc.) can be configured to transmit SOMD to smart object manager 203 at periodic intervals. In another embodiment, smart object manager 203 can be configured to request each smart object to transmit SOMD at period intervals. In yet another embodiment, smart object manager only transmits data of smart objects that have generated SOMD to smart object processing system 110.

The present invention relates to displaying information associated with one or more smart objects to the user. During user interaction with a 3D environment, a set of smart objects is presented to the user via user interface 112. Each smart object can be a generic smart object associated with non-branded information, or a branded smart object that is associated with information related to a branded product or good. Upon user selection, in one embodiment, the data associated with a smart object can be displayed in a separate window (e.g., tabbed window, sliding window, pop-up window, etc.) to the user on user interface 112. For illustrative purposes the present invention embodiments of the present invention assume the presence of branded smart objects (that is, smart objects that are associated with brand information) within the 3D environment, however, a person of ordinary skill in the art would appreciate that the teachings described herein can be implemented for non-branded smart objects (that is, smart objects that have other non-branded data associated with it) as well, or a combination thereof.

In one embodiment, SOMD can be quantified as a score, value, percentage, numerical data, etc., that can be used to infer the importance (or significance) of the smart object to the user. Thus, a higher SOMD, in an embodiment, related to a smart object (compared to others in a set of smart objects) received by the smart object processing system 110, can signify the importance of the smart object to the user. Based on the received SOMD smart object processing system 110 can prioritize the brand related detailed information (BRDI) that be transmitted to the user (upon request by the user, in one embodiment), as described herein. Therefore, depending on the data chosen for implementation, in one embodiment, a higher SOMD quantifier value transmitted by a smart object would signify that the user may be interested in learning more about the information associated with the smart object.

As a non-limiting example, if user proximity and/or viewability of the set of smart objects is selected as the SOMD, then the percentage value of the screen taken by each of the set of smart objects and/or their proximity to the user can signify as a metric quantifier that the user may be interested in learning more about a smart object out of the set of smart objects of a 3D environment. The set of smart objects can include, a number of smart objects within the three dimensional online environment, a number of smart objects displayed on the user interface, a number of smart objects within a scene of the three dimensional environment, or a number of smart objects that have been rendered within the three dimensional environment.

For a set of smart objects, smart object manager 203 transmits smart object related data, including smart object identification data (SOID) (e.g., smart object ID number) and related SOMD of each smart object, to smart object data engine 205 of smart object processing system 110. In one embodiment, smart object manager 203 can transmit smart object related data of each smart object at periodic intervals. In another embodiment, smart object manager 203 transmits the smart object related data of each smart object upon user request to display BRDI associated with one or more smart object. In yet another embodiment, smart object manager 203 can transmit smart object related data of each smart object in real-time, that is, as soon as the data is received from the smart object(s). In one embodiment, upon receiving smart object related data, smart object data engine 205 can process SOMD of each smart object identified by its respective SOID to determine its respective significance to the user. In one embodiment, when a user requests BRDI to be displayed on user interface 121, smart object data engine 205 determines the smart object with the highest SOMD, and retrieves (and transmits) BRDI related to the smart object is retrieved from database repository 121. In another embodiment, smart object data engine 205 also retrieves brand identification data (BID) (e.g., brand name, trademark, brand related identification data, etc.) associated with each smart object of the set of smart objects and generates a list of BID that is also transmitted to the user upon request. In one embodiment, BID for each smart object is transmitted along with BRDI of the smart object with the highest SOMD. In another embodiment, BID of each smart object is sorted based on its SOMD quantifying information before it is transmitted to user interface 121. Thereafter, BRDI of the smart object with the highest SOMD quantifier value is displayed to the user. The user is also presented a list of BID associated with each smart object out of the set of smart objects. The user can then select a BID from the list; smart object data engine 205 then retrieves associated BRDI associated with the BID from database 121 and transmits it to user interface 121 for display to the user. In one embodiment, BRDI includes engagement data associated with the brand. Engagement data, in one embodiment, can include a discount coupon, a social media/networking web link, an email based link (that is, a link to directly share with another person over email), a web link to visit a web page associated with the branded information, or a web link to purchase the product/good or service associated with the smart object whose BRDI is displayed on user interface 112, or generally any form of digital communication to share the information with another party, as appreciated by a person of ordinary skill in the art.

Figure 3:
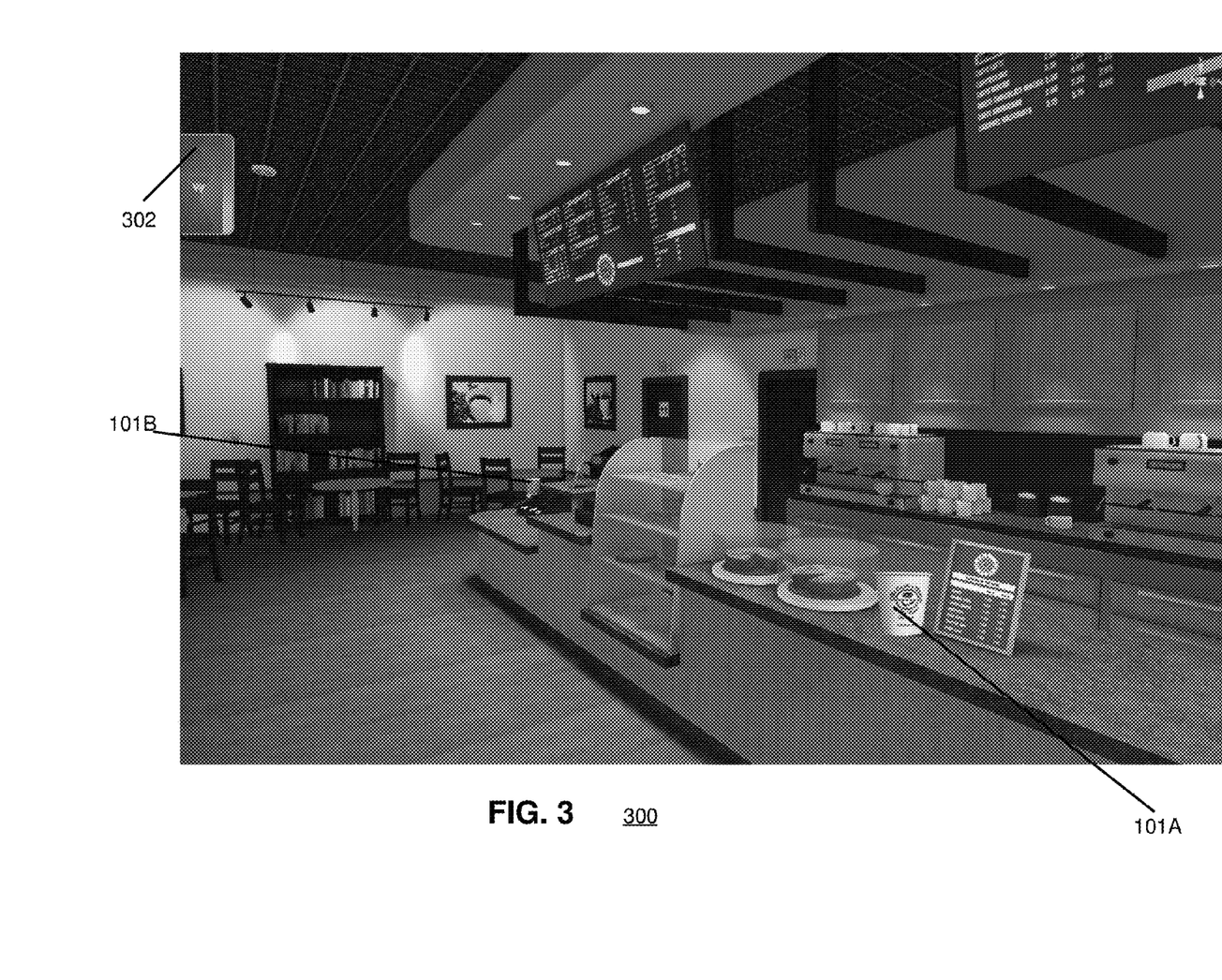
FIG. 3 illustrates a 3D environment displaying smart objects and a button or tab to display detailed branded information related to the smart objects, according to one embodiment of the present invention.

FIG. 3 illustrates a scene in 3D environment 300 displaying smart objects and a button or tab to display detailed branded information related to the smart objects, according to one embodiment of the present invention. As illustrated, a scene in 3D environment 300 displays an exemplary embodiment of a coffee shop that can be available to the user in a 3D environment (e.g., game, website, virtual reality, augmented reality, etc.). In the example represented by FIG. 3, smart objects 101A/101B can be displayed to the user.

Other smart objects that are not currently within the user's view port may also be present in the scene (or generally within the 3D environment). In one embodiment, tab 302 can be presented to the user, which when selected (e.g., clicked, touched, swiped, etc.) displays BRDI associated with at least one smart object out of a set of smart objects within 3D environment 300, as further illustrated in FIG. 4. In one embodiment, tab 302 can be presented to the user when a smart object is displayed on the screen. In another embodiment, tab 302 can be presented to the user when the user interacts with a smart object. In yet another embodiment, tab 302 can be presented when the user generally interacts with 3D environment 300. In another embodiment, tab 302 can be represented by a button on user interface 112 or can also be a physical hardware button (e.g., play button in a gaming hardware, etc.). Tab 302, in one embodiment, can be displayed to the user when the smart object processing system 110 determines that a user may be interested in learning about the smart objects presented to the user. In this embodiment, smart object manager 203 can continuously transmit relevant SOMD to smart object processing system 110 using which smart object processing system 110 can determine whether displaying tab 302 would be appropriate to the user. For example, based on the user's past action or interaction with a smart object or its associated BRDI (e.g., previous purchase, social network share history, etc.) and the transmitted SOMDs, smart object processing system 110 can, in one embodiment, automatically display tab 302 and/or prioritize the BRDI to be displayed to the user when tab 302 is selected by the user (e.g., if a new coupon, discount, incentive, etc. is available).

Figure 4:
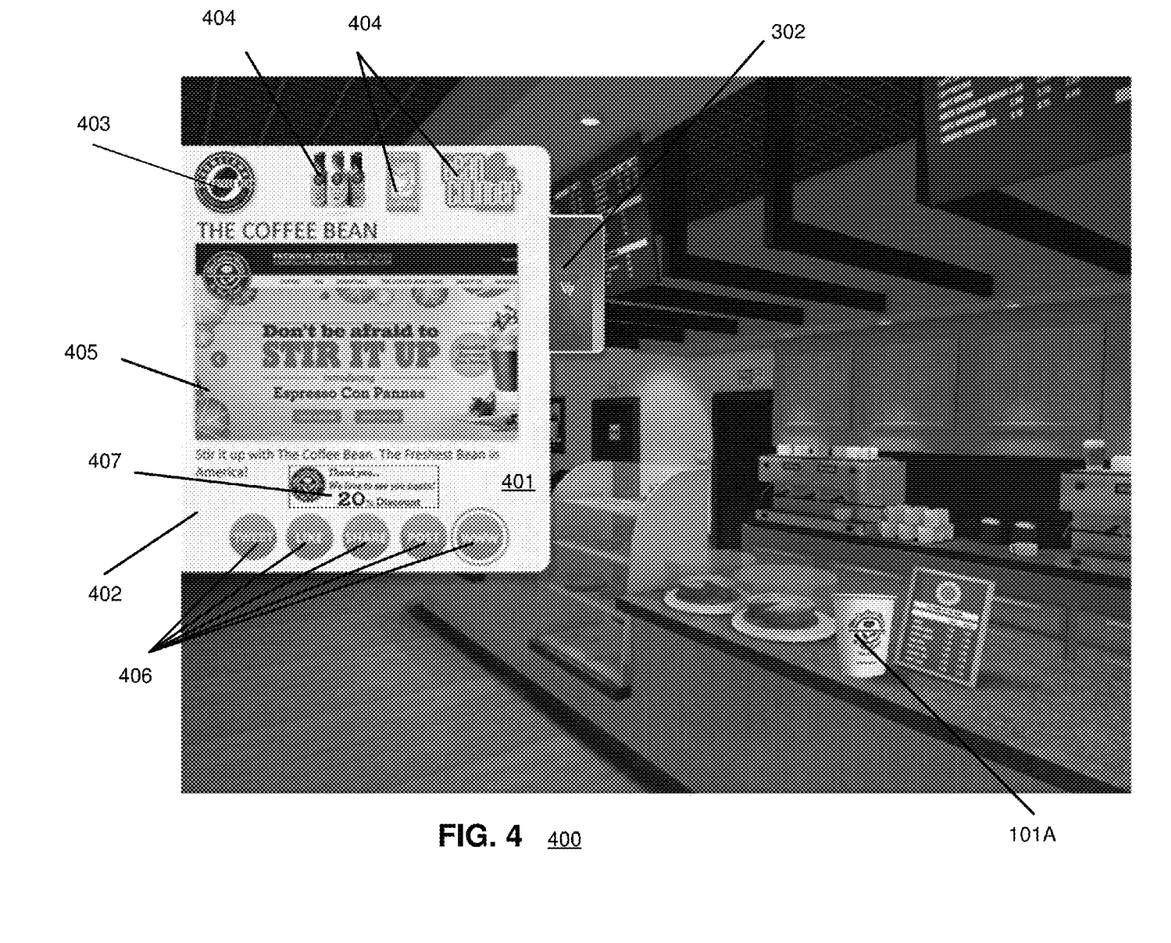
FIG. 4 illustrates a 3D environment displaying detailed brand information associated with the smart object along with a sorted list of brand information associated with a set of smart objects, according to one embodiment of the present invention.

FIG. 4 illustrates a 3D environment scene 400 displaying BRDI associated with the smart object along with a sorted list of brand information associated with a set of smart objects, according to one embodiment of the present invention. In one embodiment, after user clicks on tab 302, smart object data engine 205 can determine, based on the SOMD of each smart object received from smart object manager 203, that BRDI associated with smart object 101A would be significant to the user. Significance can be determined based on the highest SOMD received by smart object data engine 205, as described above. As an example, SOMD, in one embodiment, can be a user viewability metric data or a smart object proximity to the user metric data to determine the user's proximity to a smart object. As illustrated, after smart object data engine 205 determines data related to smart object 101A may be significant to the user, BDRI 402 associated with smart object 101A is transmitted to the user in window 401. In one embodiment, BRDI 402 can include a main brand display message 405, a promotion or coupon 407, and/or engagement data 406. Engagement data 406 can include a discount coupon, a social media web link, a web link to visit a web page associated with the braded information, or a web link to purchase the object or service associated with smart object 101A. In another embodiment, an advertiser, via advertiser interface 104, configure which engagement data related to smart object 101A is displayed to the user (e.g., by selecting the engagement data the advertiser determines important or significant).

As illustrated in FIG. 4 by reference numerals 403 and 404, smart object data engine 205 can also transmit a list of BID associated with a set of smart objects associated with the 3D environment that may or may not be displayed to the user. In one embodiment, the list of BID can be sorted based on a SOMD quantifier as described above. As illustrated, BID 403 represents the BRDI 402 displayed in window 401. The list of BID can also display BIDs 404, each BID 404 associated with another smart object; when a user selects BID 404 corresponding BRDI 402 is displayed in window 401. In one embodiment, the system can track and maintain a log of the smart objects which can be of interest to a user (based on user interaction with the smart object). As mentioned above, in one embodiment, smart object processing system 110 can determined BRDI 402 associated with a smart object that is initially displayed to the user. For example, if it is determined that smart object 101A is of significance to the user (e.g., user previously purchased good/product/service associated with smart object 101A, shared its information on social media, etc.), quantifier value of SOMD associated with smart object 101A can be automatically increased by smart object processing system 110 based on the user's history with the smart object. In another embodiment, smart object processing system 110 can increase (or decrease) the SOMD based on previous user interaction with BRDI associated with the smart object. In one embodiment, smart object processing system 110 can also determine a user's interest in a smart object based on information shared on a social network. For example, if the user complains about a brand or writes a negative statement (on a social network) about a brand associated with smart object 101A, the system can determine the user's likeness or grievance about a brand and can automatically present incentives and adjust the benefit thereof (e.g., customer loyalty discounts, free trials, etc.) for the user. In one embodiment, based on the user's comments regarding a brand associated with a smart object, the advertiser can opt-out from displaying the specific brand to the user. Thus, the system can be configured to automatically adjust discounts, incentives, or completely remove a brand associated with a smart object for a user based on their interaction with engagement data related to smart object 101A. If the advertiser opts to remove its brand, another advertiser can opt in to take its place. In one embodiment, the advertiser can be given an option to configure, via advertiser interface 104, the minimum and maximum discount an advertiser is willing to offer in a coupon or promotion. The system can then automatically adjust the discount or incentive offered to the user based on the user's tracked history with a brand associated with a smart object. Similarly, if a user engages with the BRDI associated with a smart object, next time the user visits the same scene of the 3D environment, the advertiser can opt to display another product, or opt that its product is not displayed to the user again until a certain period of time elapses (e.g., days, weeks, months, etc.).

Figure 5:
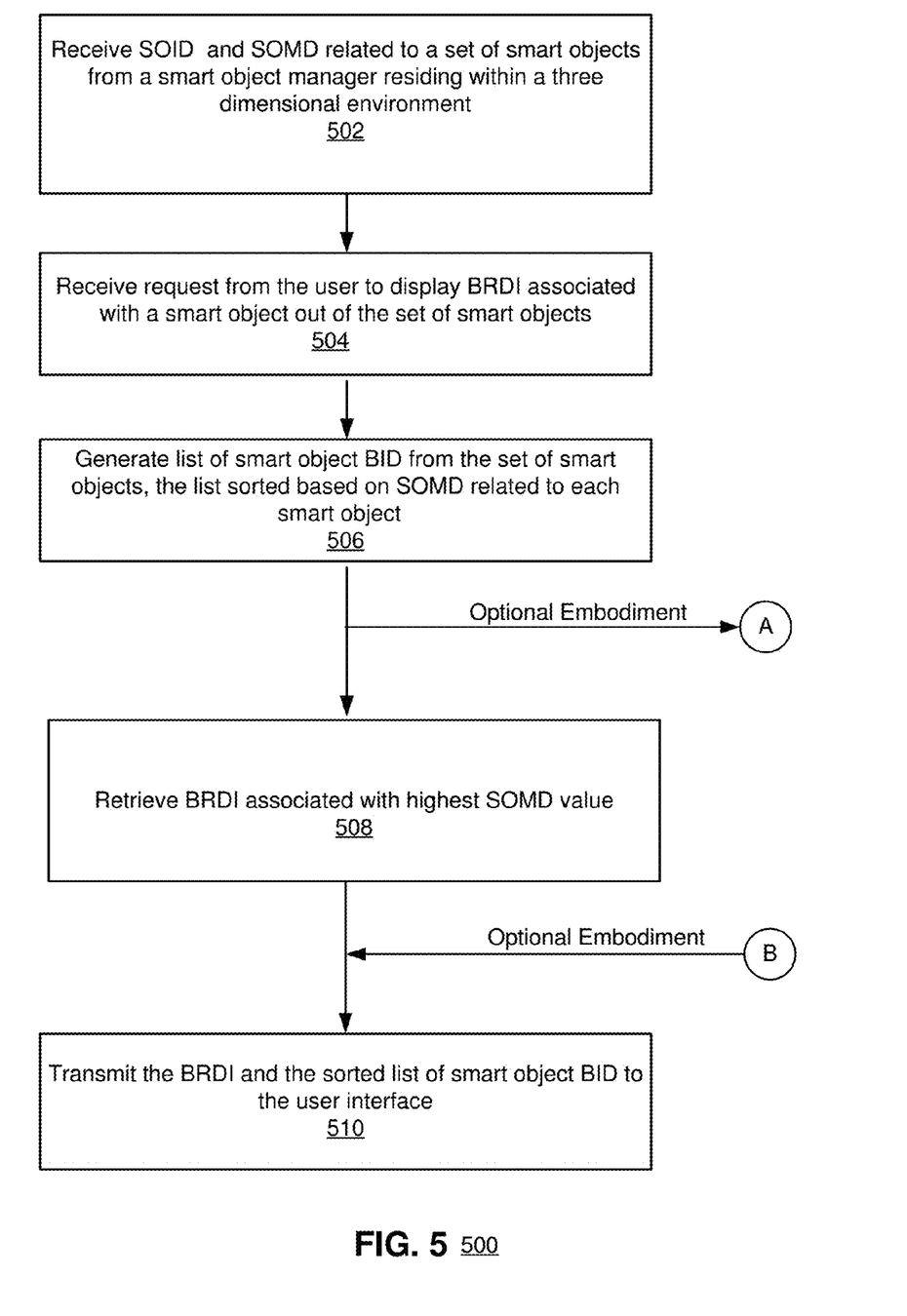
FIG. 5 illustrates a flowchart describing method of displaying branded information associated with a smart object by a server, according to one embodiment of the present invention.

FIG. 5 illustrates flowchart 500 describing method of displaying branded information associated with a smart object by a server, according to one embodiment of the present invention. As illustrated, at 502, smart object processing system 110 can receive smart object related data, including SOID and SOMD related to a set of smart objects from smart object manager residing within a 3D environment. At 504, the system can receive a request from a user (e.g., when the user selects tab 302) to display BRDI associated with at least one smart object out of the set of smart objects of the 3D environment. At 506, the system generates a list of smart object BID from the set of smart objects. In one embodiment, the list of BID can be sorted based on SOMD related to each smart object. At 508, the system can retrieve BRDI associated with the highest quantifier of SOMD and at 510, the system transmits the BRDI and the sorted list of BID to user interface 112 (e.g., in window 401).

Figure 6:
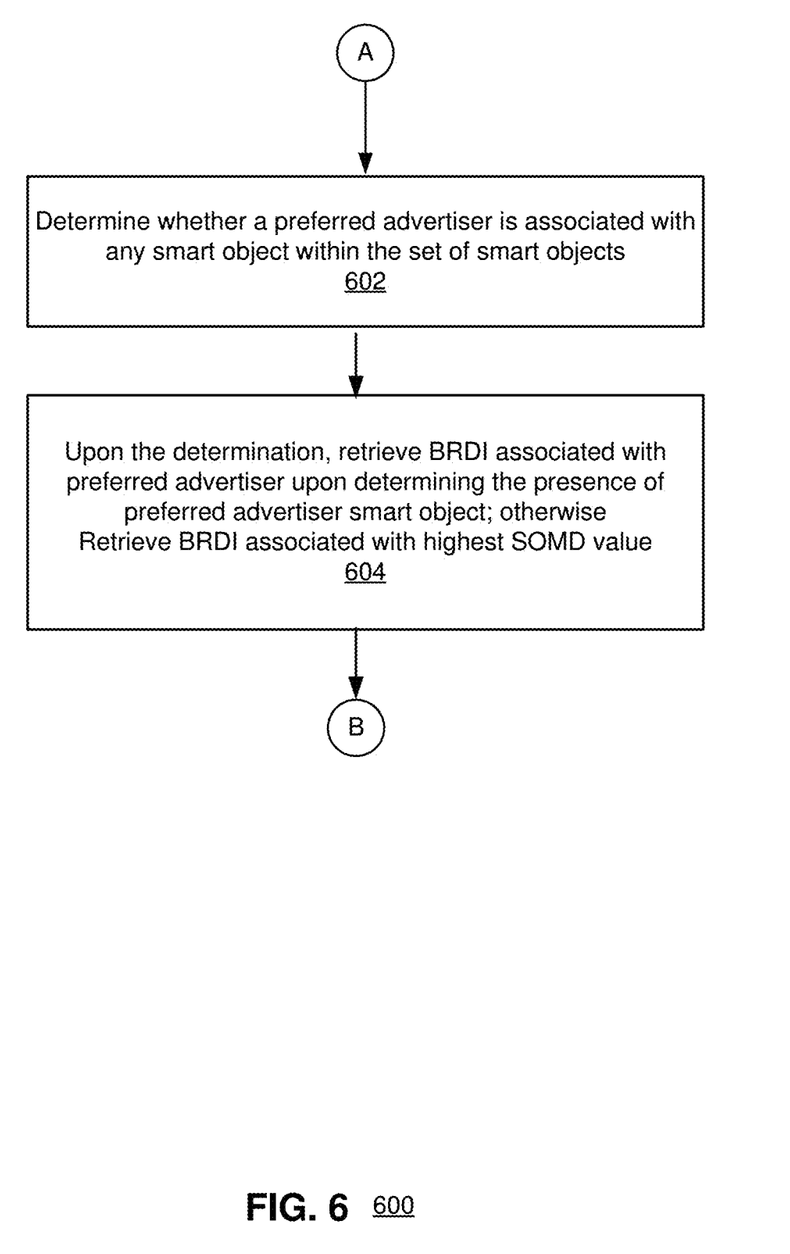
FIG. 6 illustrates a flowchart describing an alternate embodiment of the method of displaying branded information associated with a smart object by a server, according to one embodiment of the present invention.

FIG. 6 illustrates flowchart 600 describing an alternate embodiment of the method of displaying branded information associated with a smart object by a server, according to one embodiment of the present invention. Reference A initiates an alternative embodiment after block 506 of FIG. 5. In one embodiment, the system can be configured to determine whether a preferred advertiser is associated with any smart object within the set of smart objects, as illustrated by block 602. At 604, upon such a determination, the system retrieves BRDI associated with the smart object of the preferred advertiser, otherwise the brand related information associated with the highest SOMD is retrieved. Control is then transferred back to 510 where the retrieved BRDI and sorted list is transmitted to the user interface 112.

In one embodiment, the user can request BRDI associated with another smart object by selecting the BID of that smart object from the BID list. In another embodiment, the smart object manager transmits the SOID and SOMD related data of the set of smart objects upon determining the SOMD of at least one smart object that is associated with a branded service or product. Further, the list of smart object BID can be sorted from highest to lowest based on SOMD of each smart object in the set of smart objects. In yet another embodiment, the system, for retrieving BRDI related to a smart object, determines the presence of BID associated with a preferred advertiser within the set of smart objects and retrieves the BRDI of the smart object associated with the preferred advertiser instead of the smart object with the highest BRDI. In yet another embodiment, transmitting the BRDI to the user includes transmitting engagement data (that can optionally be selected by an advertiser). The engagement data in one embodiment, includes at least one of a discount coupon, a social media web link, a web link to visit a web page associated with the braded information, or a web link to purchase the object or service associated with the at least one smart object. In yet another embodiment, the system determines that the user has requested BRDI associated with at least one smart object by receiving an instruction that the user has selected a tab or button within the user interface. In another embodiment, the set of smart objects can be a number of smart objects within the three dimensional online environment, a number of smart objects displayed on the user interface, a number of smart objects within a scene of the three dimensional environment, or a number of smart objects that have been rendered within the three dimensional environment.

Figure 7:
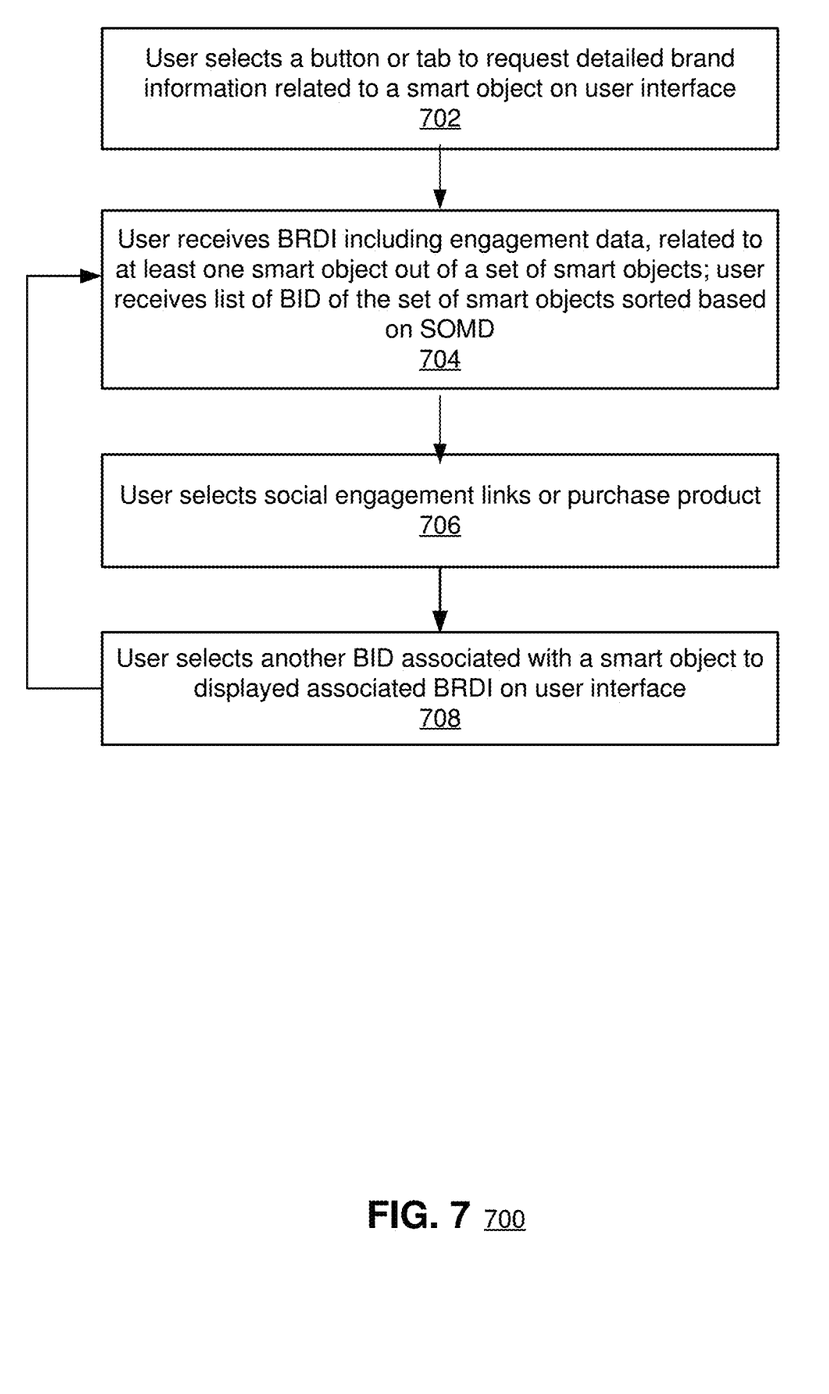
FIG. 7 illustrates a flow chart describing a method implemented by a user of displaying branded information associated with a smart object by a server, according to one embodiment of the present invention.

FIG. 7 illustrates flow chart 700 describing a method implemented by a user of displaying branded information associated with a smart object by a server, according to one embodiment of the present invention. As illustrated, at 702, the user selects a button or tab to request BRDI related to a smart object from user interface. At 704, the user receives BRDI including engagement data related to at least one smart object out of the set of smart objects. The user receives a list of BID of the set of smart objects that can, in an optional embodiment, be sorted based on SOMD that can be a quantifier value. At 706 the user selects engagement data or purchases a service product associated with the smart object whose BRDI is displayed. The user can also select BID from the list to view BRDI associated with the smart object whose BID is currently selected, as illustrated at block 708.

Figure 8:
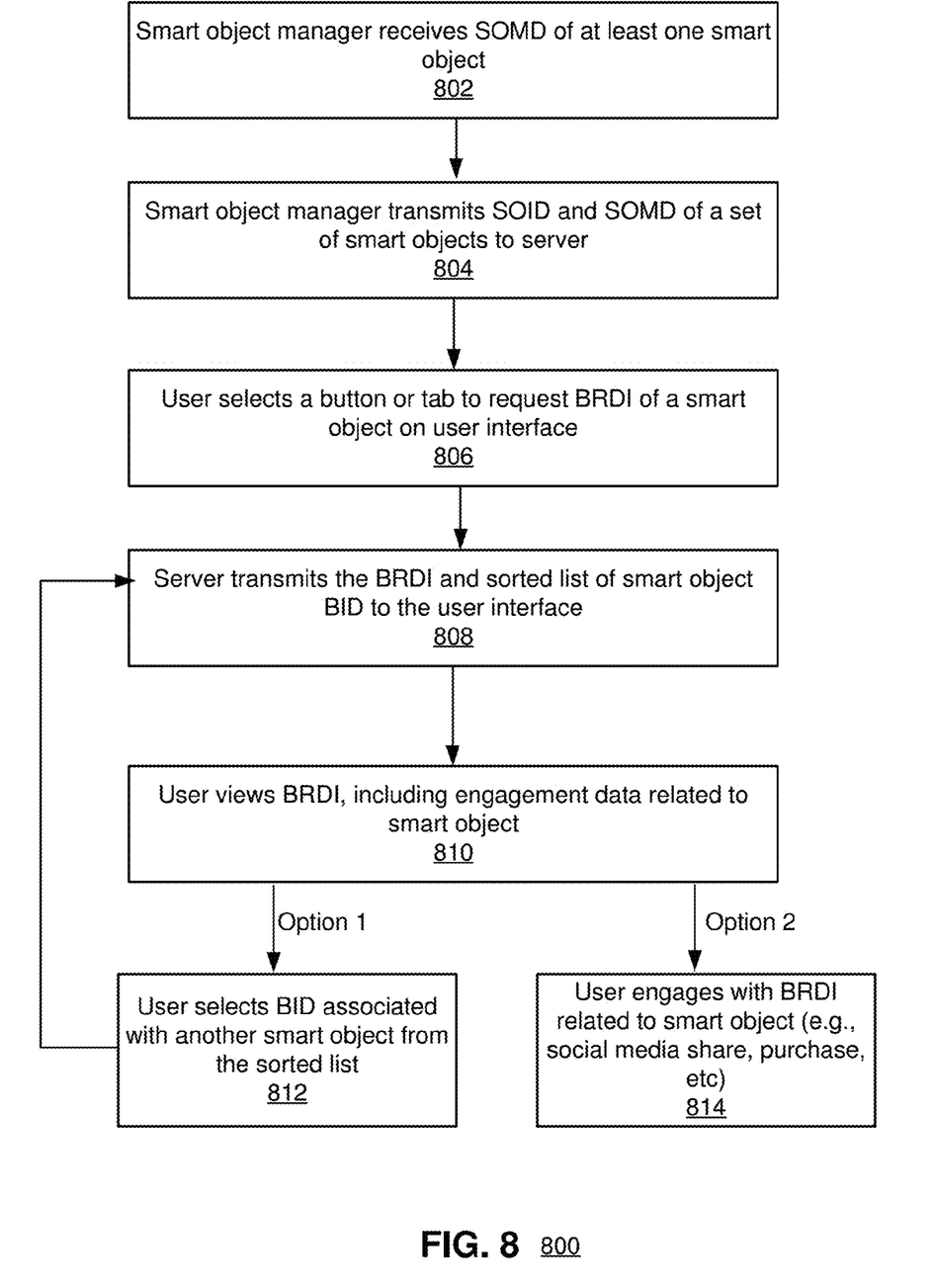
FIG. 8 illustrates a flow chart describing a system of displaying branded information associated with a smart object by a server, according to one embodiment of the present invention.

FIG. 8 illustrates flow chart 800 describing a system of displaying branded information associated with a smart object by a server, according to one embodiment of the present invention. As illustrated, at 802, smart object manager receives BRDI of at least one smart object within a 3D environment. At 804, smart object manager transmits SOID and SOMD of a set of smart objects to the server. At 806, the user selects a button or tab to request BRDI associated with at least one smart object within the 3D environment, via a user interface. At 808, the server transmits BRDI associated with the at least one smart object along with a list of BID associated with the set of smart objects within the 3D environment. At 810, the user can select engagement data from the displayed BRDI. At 812, the user can opt to select BID related to another smart object from the list of BID associated with the set of smart objects and control transfers back to 808 where the server retrieves and transmits the requested information to the user. Alternatively, as illustrated at 814, the user can engage with displayed BRDI from where the system can track user's interaction with the associated smart object.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Figure 9:
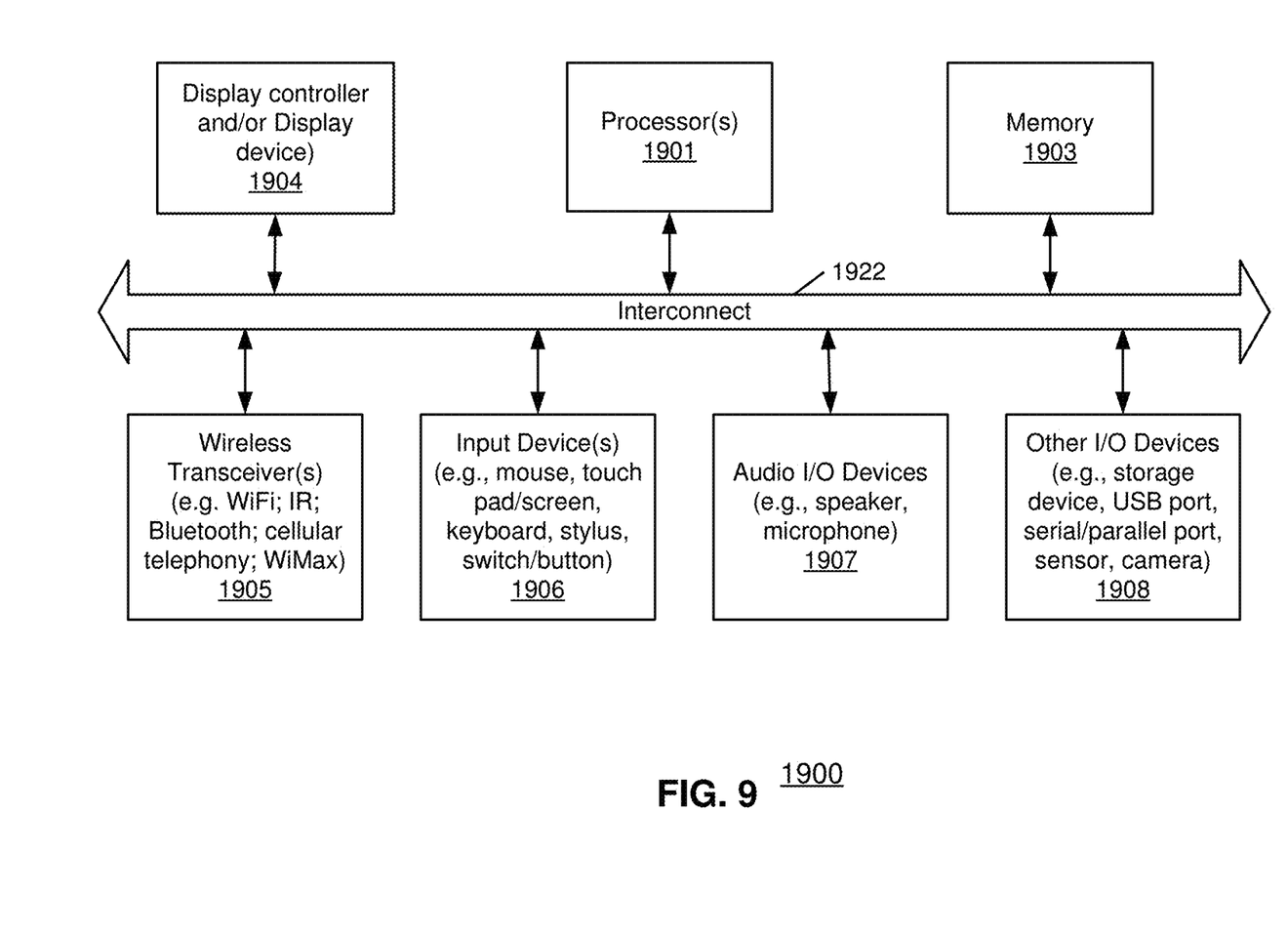
FIG. 9 illustrates a block diagram illustrating a data processing system such as a computing system which may be used with one embodiment of the invention.

FIG. 9 is a block diagram illustrating a data processing system such as a computing system 1900 which may be used with one embodiment of the invention. For example, system 1900 may be implemented as part of a system to display information associated with a smart object. In one embodiment, system 1900 may represent smart object processing system 110. System 1900 may have a distributed architecture having dispersed units coupled through a network, or all of its components may be integrated into a single unit. Computing system 1900 may be implemented as part of a diverse range of products implemented by Trivver, Inc.

For example, computing system 1900 may represents any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional or fewer components may be present in certain implementations and furthermore, different arrangement of the components shown may occur in other implementations. System 1900 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra low voltage processor, may act as a main processing unit and central hub for communication with the various components of the system. Such processor can be implemented as a system on chip (SoC). In one embodiment, processor 1901 may be an Intel® Architecture Core™-based processor such as an i3, i5, i19 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1901 is configured to execute instructions for performing the operations and methods discussed herein. System 1900 further includes a graphics interface that communicates with graphics subsystem 1904, which may include a display controller and/or a display device.

Processor 1901 may communicate with memory 1903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 2007), or a next generation LPDDR standard to be referred to as LPDDR3 that will offer extensions to LPDDR2 to increase bandwidth. As examples, 2/4/8 gigabytes (GB) of system memory may be present and can be coupled to processor 1901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including wireless transceiver(s) 1905, input device(s) 1906, audio IO device(s) 19019, and other IO devices 1908. Wireless transceiver 1905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1907 may include a speaker and/or a microphone to facilitate voice-enabled functions, such as voice recognition, voice replication, digital recording, and/or telephony functions. Other optional devices 1908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1907 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium of displaying information associated with a smart object are described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method of displaying brand related information on a user interface displaying a three dimensional (3D) environment of a digital processing device, comprising:
    receiving, by a computing device, Smart Object Identification Data (SOID) and Smart Object Metric Data (SOMD) of a set of smart objects displayed in the 3D environment, wherein the SOMD is based on user viewability or proximity to each smart object out of the set of smart objects, and wherein the SOMD of a smart object out of the set of smart objects is generated, by the digital processing device, using at least one event script, the at least one event script configured for:
    evaluating whether the smart object is drawn on a culling mask of a camera of the 3D environment,
    based on the evaluating, drawing, by ray casting, a line between the camera and the smart object,
    determining that the line collides with a collidable mesh of the smart object, calculating using a screen bound function, a proportion of the smart object on a user interface to obtain a percentage of the user interface that is covered by the smart object, and generating SOMD for the smart object based on the percentage of the user interface that is covered by the smart object;

determining, by the computing device, that Brand Related Detailed Information (BRDI) associated with at least one smart object has been requested to be displayed on the user interface;

generating, by the computing device, a list of smart object associated Brand Identification Data (BID) from the set of smart objects, wherein the list is sorted based on the SOMD related to each smart object within the set of smart objects;

retrieving, by the computing device, BRDI of a first smart object out of the set of smart objects, wherein the first smart object has the highest SOMD;

transmitting, by the computing device, the BRDI of the first smart object and the sorted list of smart object BID to the user interface;

wherein the BRDI associated with the first smart object is displayed on the user interface along with the sorted list of smart object BID.

2. The method of claim 1, wherein BRDI associated with a second smart object can be requested by selecting the BID of the second smart object from the sorted list displayed on the user interface.

3. The method of claim 1, wherein the SOID and SOMD related data of the set of smart objects are transmitted upon determining the SOMD of the first smart object, wherein the first smart object is associated with a branded service or product.

4. The method of claim 1, wherein the list of smart object BID is sorted from highest to lowest based on SOMD of each smart object in the set of smart objects.

5. The method of claim 1, wherein retrieving BRDI further includes:
   determining a presence of BID associated with a preferred advertiser within the set of smart objects; and
   retrieving BRDI of the smart object associated with the preferred advertiser instead of the first smart object upon the determining.

6. The method of claim 1, wherein the transmitting of the BRDI includes transmitting engagement data, wherein the engagement data is selected by an advertiser, and wherein the engagement data includes at least one of a discount coupon, a social media web link, an email based link, a web link to visit a web page associated with the BRDI, or a web link to purchase a product or service associated with the at least one smart object.

7. The method of claim 1, wherein determining that BRDI associated with the first smart object has been requested on the user interface includes receiving an instruction that a tab or button within the user interface has been selected.

8. The method of claim 1, wherein the set of smart objects includes at least one of a number of smart objects within the 3D environment, a number of smart objects displayed on the user interface, a number of smart objects within a scene of the 3D environment, or a number of smart objects that have been rendered within the 3D environment.

9. A non-transitory computer readable medium comprising instructions which when executed by a processing system comprising at least one core performs a method of displaying brand related information on a user interface displaying a three dimensional (3D) environment, the method comprising:
   receiving Smart Object Identification Data (SOID) and Smart Object Metric Data (SOMD) of a set of smart objects displayed in the 3D environment, wherein the SOMD is based on user viewability or proximity to each smart object out of the set of smart objects, and wherein the SOMD of a smart object out of the set of smart objects is generated using at least one event script, the at least one event script configured for:
   evaluating whether the smart object is drawn on a culling mask of a camera of the 3D environment,
   based on the evaluating, drawing, by ray casting, a line between the camera and the smart object,
   determining that the line collides with a collidable mesh of the smart object,
   calculating, using a screen bound function, a proportion of the smart object on a user interface to obtain a percentage of the user interface that is covered by the smart object, and
   generating the SOMD for the smart object based on the percentage of the user interface that is covered by the smart object;
   determining that Brand Related Detailed Information (BRDI) associated with at least one smart object has been requested to be displayed on the user interface;
   generating a list of smart object associated Brand Identification Data (BID) from the set of smart objects, wherein the list is sorted based on the SOMD related to each smart object within the set of smart objects;
   retrieving BRDI of a first smart object out of the set of smart objects, wherein the first smart object has the highest SOMD;
   transmitting the BRDI of the first smart object and the sorted list of smart object BID to the user interface;
   wherein the BRDI associated with the first smart object is displayed on the user interface along with the sorted list of smart object BID.

10. The non-transitory computer readable medium of claim 9, wherein BRDI associated with a second smart object can be requested by selecting the BID of the second smart object from the sorted list displayed on the user interface.

11. The non-transitory computer readable medium of claim 9, wherein the SOID and SOMD related data of the set of smart objects are transmitted upon determining the SOMD of the first smart object, wherein the first smart object is associated with a branded service or product.

12. The non-transitory computer readable medium of claim 9, wherein the list of smart object BID is sorted from highest to lowest based on SOMD of each smart object in the set of smart objects.

13. The non-transitory computer readable medium of claim 9, wherein retrieving BRDI further includes:
   determining a presence of BID associated with a preferred advertiser within the set of smart objects; and
   retrieving BRDI of the smart object associated with the preferred advertiser instead of the first smart object upon the determining.

14. The non-transitory computer readable medium of claim 9, wherein the transmitting the BRDI includes transmitting engagement data, wherein the engagement data is selected by an advertiser, and wherein the engagement data includes at least one of a discount coupon, a social media web link, an email based link, a web link to visit a web page associated with the BRDI, or a web link to purchase a product or service associated with the at least one smart object.

15. The non-transitory computer readable medium of claim 9, wherein determining that BRDI associated with the first smart object has been requested on the user interface includes receiving an instruction that a tab or button within the user interface has been selected.

16. The non-transitory computer readable medium of claim 9, wherein the set of smart objects includes at least one of a number of smart objects within the 3D environment, a number of smart objects displayed on the user interface, a number of smart objects within a scene of the 3D environment, or a number of smart objects that have been rendered within the 3D environment.

17. A computer system to display brand related information on a user interface displaying a three dimensional (3D) environment of a computing device, comprising:
   a memory device;
   a processing device coupled to the memory device, the processing device comprising at least one processing core configured to:
   receive Smart Object Identification Data (SOID) and Smart Object Metric Data (SOMD) of a set of smart objects displayed in the 3D environment, wherein the SOMD is based on user viewability or proximity to each smart object out of the set of smart objects, and wherein the SOMD of a smart object out of the set of smart objects is generated using at least one event script, the at least one event script configured to:
   evaluate whether the smart object is drawn on a culling mask of a camera of the 3D environment,
   draw, by ray casting, a line between the camera and the smart object,
   determine that the line collides with a collidable mesh of the smart object,
   calculate, using a screen bound function, a proportion of the smart object on a user interface to obtain a percentage of the user interface that is covered by the smart object, and
   generate the SOMD for the smart object based on the percentage of the user interface that is covered by the smart object;
   determine that Brand Related Detailed Information (BRDI) associated with at least one smart object has been requested to be displayed on the user interface;
   generate a list of smart object associated Brand Identification Data (BID) from the set of smart objects, wherein the list is sorted based on the SOMD related to each smart object within the set of smart objects;
   retrieve BRDI of a first smart object out of the set of smart objects, wherein the first smart object has the highest SOMD;
   transmit the BRDI of the first smart object and the sorted list of smart object BID to the user interface;
   wherein the BRDI associated with the first smart object is displayed on the user interface along with the sorted list of smart object BID.

18. The computer system of claim 17, wherein BRDI associated with a second smart object can be requested by selecting the BID of the second smart object from the sorted list displayed on the user interface.

19. The computer system of claim 17, wherein the SOID and SOMD related data of the set of smart objects are transmitted upon determining the SOMD of the first smart object, wherein the first smart object is associated with a branded service or product.

20. The computer system of claim 17, wherein the list of smart object BID is sorted from highest to lowest based on SOMD of each smart object in the set of smart objects.

21. The computer system of claim 17, wherein to retrieve BRDI further includes to:
   determine a presence of BID associated with a preferred advertiser within the set of smart objects; and
   retrieve BRDI of the smart object associated with the preferred advertiser instead of the first smart object upon the determination of the presence of BID associated with a preferred advertiser.

22. The computer system of claim 17, wherein the transmit the BRDI includes transmitting engagement data, wherein the engagement data is selected by an advertiser, and wherein the engagement data includes at least one of a discount coupon, a social media web link, an email based link, a web link to visit a web page associated with the BRDI, or a web link to purchase a product or service associated with the at least one smart object.

23. The computer system of claim 17, wherein determining that BRDI associated with the first smart object has been requested on the user interface includes receiving an instruction that a tab or button within the user interface has been selected.

24. The computer system of claim 17, wherein the set of smart objects includes at least one of a number of smart objects within the 3D environment, a number of smart objects displayed on the user interface, a number of smart objects within a scene of the 3D environment, or a number of smart objects that have been rendered within the 3D environment.

* * * * *